(12) United States Patent
Yoon et al.

(10) Patent No.: US 11,514,436 B2
(45) Date of Patent: Nov. 29, 2022

(54) BIOMETRIC AUTHENTICATION SMART CARD

(71) Applicant: Samsung Electronics Co., Ltd., Suwon-si (KR)

(72) Inventors: Joong Chul Yoon, Seoul (KR); Han-Ju Je, Ansan-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 57 days.

(21) Appl. No.: 17/183,758

(22) Filed: Feb. 24, 2021

(65) Prior Publication Data
US 2022/0020009 A1 Jan. 20, 2022

(30) Foreign Application Priority Data

Jul. 17, 2020 (KR) .................. 10-2020-0088879

(51) Int. Cl.
*G06Q 20/38* (2012.01)
*G06Q 20/34* (2012.01)
*G06F 21/34* (2013.01)
*G06F 21/32* (2013.01)

(52) U.S. Cl.
CPC ......... *G06Q 20/3821* (2013.01); *G06F 21/32* (2013.01); *G06F 21/34* (2013.01); *G06Q 20/341* (2013.01)

(58) Field of Classification Search
CPC .. G06Q 20/3821; G06Q 20/341; G06F 21/32; G06F 21/34
USPC .......................................................... 705/44
See application file for complete search history.

(56) References Cited

U.S. PATENT DOCUMENTS

| 10,163,103 B2 | 12/2018 | Weiss | |
|---|---|---|---|
| 2005/0212657 A1* | 9/2005 | Simon | G07F 7/1008 340/5.74 |
| 2017/0289127 A1* | 10/2017 | Hendrick | H04W 12/065 |
| 2018/0349911 A1 | 12/2018 | Lamaire | |
| 2019/0087825 A1 | 3/2019 | Bhatt et al. | |

FOREIGN PATENT DOCUMENTS

JP 2001-202494 A 7/2001
JP 3994363 B2 10/2007
(Continued)

OTHER PUBLICATIONS

"Smart Card in Electronic Commerce," by N T Trask and M V Meyerstein. BT Techno J. pp. 57-66. vol. 17. No. 3. Jul. 1999. (Year: 1999).*

(Continued)

*Primary Examiner* — Sara C Hamilton
(74) *Attorney, Agent, or Firm* — Harness, Dickey & Pierce, P.L.C.

(57) ABSTRACT

A biometric authentication smart card may include a biometric authentication sensor configured to sense at least two types of biometric information of a user and to generate raw images therefrom; and processing circuitry configured to, generate a matching template including biometric features based on the raw images, select a user index from among a plurality of user indices based on the matching template, and output, to a payment terminal, payment class information and payment means information set adaptively for the user index.

20 Claims, 8 Drawing Sheets

(56) References Cited

FOREIGN PATENT DOCUMENTS

JP      2010-152841  A    7/2010
KR      20080101839  A    11/2008

OTHER PUBLICATIONS

"Extending EMV Payment Smart Cards with Biometric On-Card Verification," by Olaf Henniger and Dimitar Nikolov. IFIP Working Conference on Policies and Research in Identity Management. pp. 121-130. Apr. 2013. (Year: 2013).*

* cited by examiner

BIOMETRIC AUTHENTICATION SMART CARD

CROSS-REFERENCE TO RELATED APPLICATION

This application claims priority from Korean Patent Application No. 10-2020-0088879 filed on Jul. 17, 2020 in the Korean Intellectual Property Office, and all the benefits accruing therefrom under 35 U.S.C. 119, the contents of which in its entirety are herein incorporated by reference.

BACKGROUND

1. Technical Field

Example embodiments relate to a smart card and/or a smart payment system based on biometric authentication.

2. Description of the Related Art

In the case where a user purchases a product in an offline store and pays using a credit card, the credit card may be inserted into a point-of-sale (POS) terminal of the offline store such that the POS terminal reads out the user's payment information from the credit card for payment of the product.

However, it often happens that an unauthorized person uses a credit card for payment of a product, which spurs development of a credit card with an authentication means.

Biometrics has been drawing attention as promising user authentication technology that offers strong security and ease of use. Recently, many commercial products such as smartphones and laptop computers employ, for user authentication, biometric technology that uses single biometric information such as fingerprint, iris, and face recognition information or a combination of multiple types of biometric information. The biometric technology is also used in combination with an electronic passport system as a border control system in many countries.

With the popularization of the use of biometric information as authentication means, recently, access control and payment authentication systems using biometric information such as fingerprint and iris are increasing. Particularly, fingerprint-based systems have already been widely used due to ease of use and no significant repulsion from the standpoint of the user. However, in a conventional biometric system, a smart card may be registered with a sole registered user, where a server stores user information corresponding to the registered user. Thus, it may be difficult for multiple users to utilize a same smart card.

SUMMARY

Some example embodiments relate to a biometric authentication smart card that is capable of distinguishing usages by multiple users in a user-adaptive manner.

Some example embodiments relate to a biometric authentication smart card that is capable of efficiently preventing unauthorized use by distinguishing per-user usage classes.

According to some example embodiments, the biometric authentication smart card includes a biometric authentication sensor configured to sense at least two types of biometric information of a user and to generate raw images therefrom; and processing circuitry configured to, generate a matching template including biometric features based on the raw images, select a user index from among a plurality of user indices based on the matching template, and output, to a payment terminal, payment class information and payment means information set adaptively for the user index.

According to some example embodiments, the biometric authentication smart card includes a biometric authentication sensor configured to sense biometric information of a user and to generate a raw image therefrom; and processing circuitry configured to, generate a matching template including feature points based on the raw image, select a user index of a verification template corresponding to the matching template among a plurality of stored verification templates, and output, to a payment terminal, payment information based on the user index such that the payment information output to the payment terminal based on a first user index is different from the payment information output to the payment terminal based on a second user index.

Some example embodiments relate to a smart payment system including a payment terminal a payment terminal configured to request a payment amount based on sale-related information, and to approve a payment by comparing the sale-related information and the payment amount with payment class information; and the biometric authentication smart card.

However, example embodiments are not restricted to those set forth herein. The above and other aspects of the present disclosure will become more apparent to one of ordinary skill in the art to which the present disclosure pertains by referencing the detailed description given below.

BRIEF DESCRIPTION OF THE DRAWINGS

The above and other aspects and features of the present disclosure will become more apparent by describing in detail some example embodiments thereof with reference to the attached drawings, in which.

DETAILED DESCRIPTION

Hereinafter, various example embodiments of the present disclosure will be described with reference to the accompanying drawings.

Figure 1:
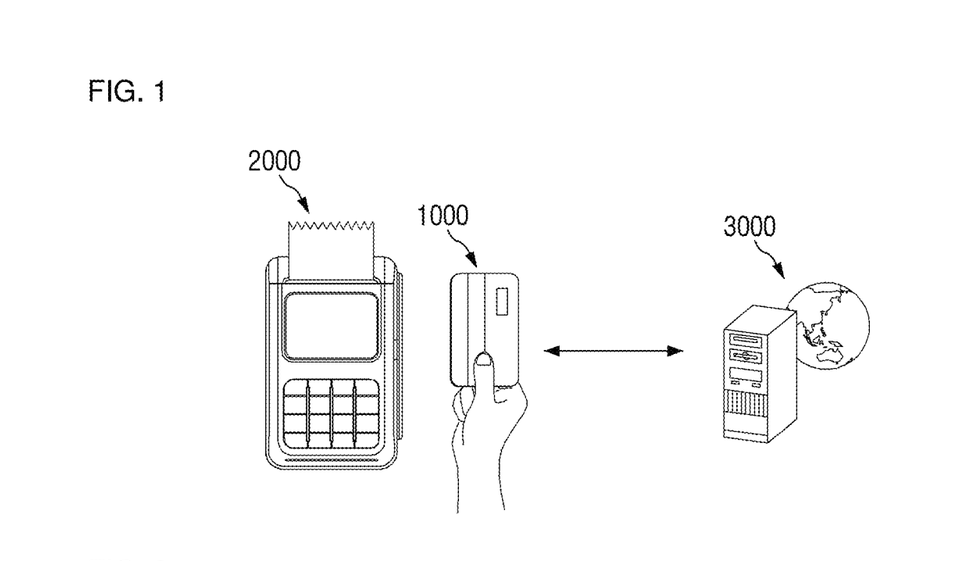
FIG. 1 is a view illustrating a biometric authentication smart card payment system according to some example embodiments.

FIG. 1 is a view illustrating a biometric authentication smart card payment system according to some example embodiments.

Referring to FIG. 1, the payment system may include a biometric authentication smart card 1000, a payment terminal 2000, and a payment server 3000 according to some example embodiments.

According to some example embodiments, if payment request information including payment amount information is output from the online/offline payment terminal 2000, the biometric authentication smart card 1000 outputs payment means information corresponding to the payment request information. The biometric authentication smart card 1000 will be described later in detail with reference to FIGS. 2 to 6.

The payment terminal 2000, as a means for storing payment amount information on kinds, numbers, and prices of products sold online/offline and managing sale information for each product according to some example embodiments, may be a point-of-sales (POS) terminal in case of offline transaction according to an example embodiment, an online shopping mall system in case of online transaction according to another example embodiment, or a terminal device that is capable of accessing a smart card to read out information related to payment and communicating with a payment server according to still another example embodiment.

The payment terminal 2000 may be installed in an offline store and can extract product information from a barcode attached to each product for sale by using a reader, or the like. According to some example embodiments, the product information may include information on a kind of the product, a product code, selling price and the like.

The payment terminal 2000 may transmit sale-related information to the payment server 3000. According to some example embodiments, the sale-related information may include at least one of selling price information, ID of the payment terminal 2000, time when the selling price information of the product was extracted by the payment terminal 2000, type of the task to be processed by the payment terminal 2000, domain information of a management server of the payment terminal 2000, or deposit account information of an owner of the payment terminal 2000.

Further, the payment terminal 2000 may transmit the payment information read from the smart card 1000 to the payment server 3000. The payment information includes payment class information and payment means information of a user registered for the smart card 1000.

According to some example embodiments, the payment means information may include payment account information or payment card information. According to some example embodiments, the payment account information, as the user's bank account information, may include at least one of a bank account number, an account password, or a security-related authentication number. According to some example embodiments, the payment card information may include at least one of a card company for settlement, a card number, or a card password.

Further, the payment terminal 2000 may verify whether the user is registered for the smart card 1000 based on biometric authentication information of the payment information read from the smart card 1000 and, if verified as a registered user, transmit payment class information corresponding to a user index of the corresponding user to the payment server 3000.

The payment server 3000 determines whether to approve payment based on the sale-related information and payment information received from the payment terminal 2000, and transmits a result of the approval determination to the payment terminal 2000.

According to some example embodiments, the payment server 3000 determines whether to approve payment of money indicated by the sale-related information based on the payment means information and payment class information received based on the payment information.

For example, in the case where the payment information is the payment account information, the payment server 3000 may be a payment server of a financial institution (such as a bank) with which the user opened a bank account. For example, in the case where the payment information is the payment card information, the payment server 3000 may be a payment server of the financial institution (card company) with which the user opened a payment card.

In the specification, the term "normal user" may refer to a user who is registered with the payment server 3000 and has a payment account in which the deposited money is equal to or greater than the money requested for payment, or has a payment card whose credit limit is higher than the payment-requested money.

If a normal user is verified, the payment server 3000 checks selling price information and ID of the payment terminal 2000 from the sale-related information, and compares the information with the user's available payment range from the payment class information to determine whether to approve the payment. A detailed description thereof will be made later.

Figure 2:
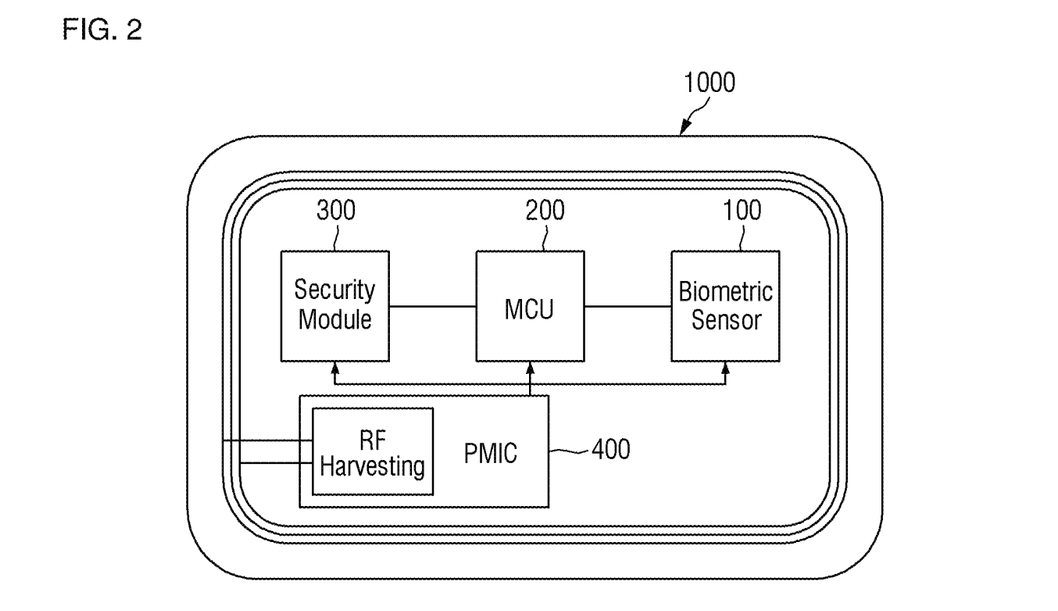
FIG. 2 is a diagram illustrating a biometric authentication smart card according to some example embodiments.
Figure 3:
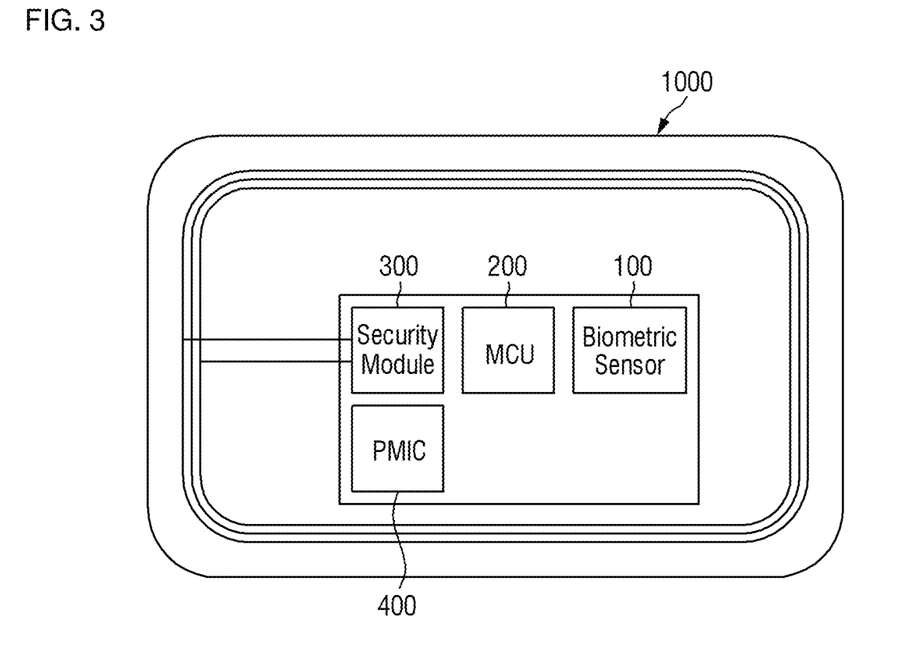
FIG. 3 is a diagram illustrating a biometric authentication smart card according to some example embodiments.
Figure 4:
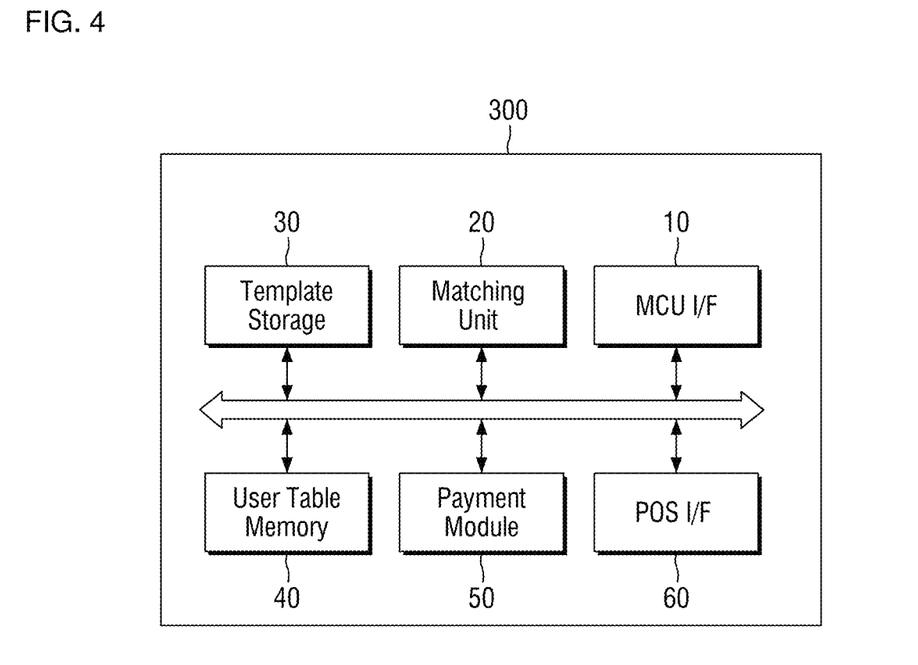
FIG. 4 is a diagram illustrating a security module according to some example embodiments.
Figure 5:
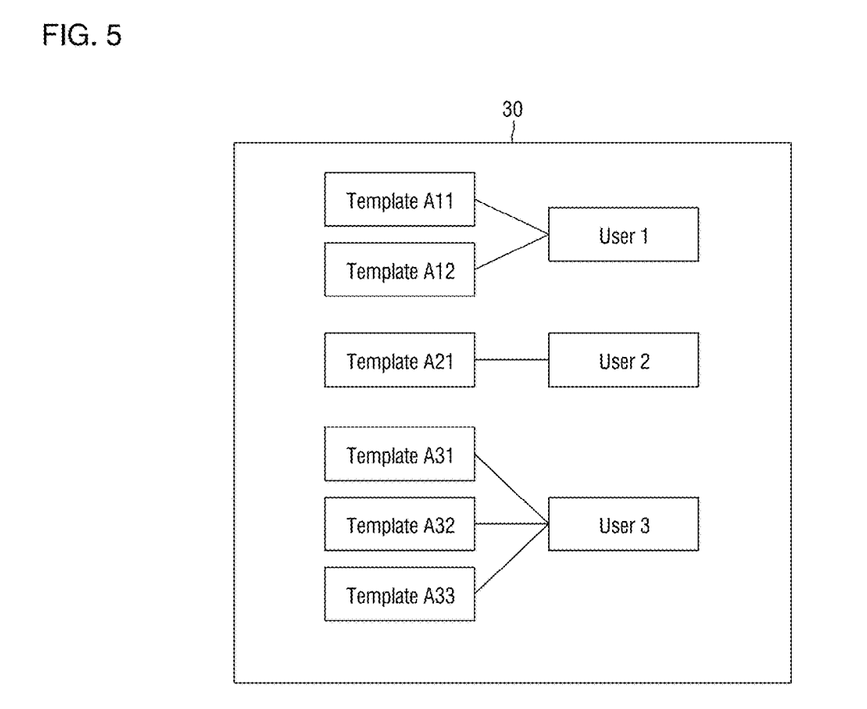
FIG. 5 is a diagram illustrating a template storage unit according to some example embodiments.
Figure 6:
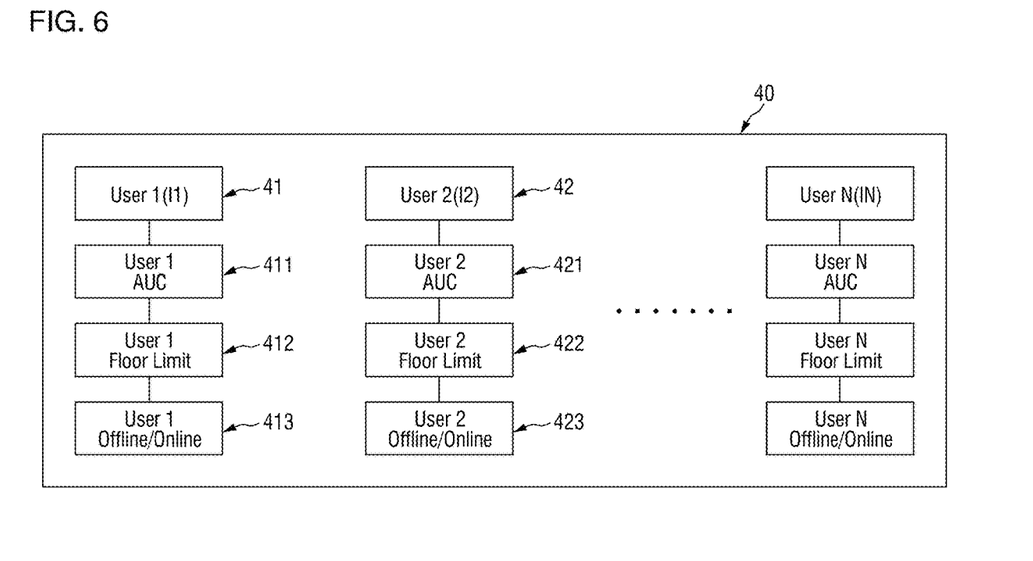
FIG. 6 is a diagram illustrating a user table memory according to some example embodiments.

FIG. 2 is a diagram illustrating a biometric authentication smart card according to some example embodiments. FIG. 3 is a diagram illustrating a biometric authentication smart card according to some example embodiments. FIG. 4 is a diagram illustrating a security module according to some example embodiments. FIG. 5 is a diagram illustrating a template storage unit according to some example embodiments. FIG. 6 is a diagram illustrating a user table memory according to some example embodiments.

Referring to FIGS. 2 and 3, the biometric authentication smart card 1000 may include a biometric authentication sensor 100, a micro control unit (MCU) 200, a security module 300, and a power module 400.

According to some example embodiments, the biometric authentication sensor 100, the MCU 200, the security module 300, and the power module 400 may be implemented as individual chips as shown in FIG. 2. Unlike the example of FIG. 2 in which they are implemented as individual chips, at least two of the biometric authentication sensor 100, the MCU 200, the security module 300, and the power module 400 may be implemented into one chip. As an example, the biometric authentication sensor 100 and the MCU 200 may be implemented into one chip while the security module 300 and the power module 400 may be implemented as individual chips. As another example, the security module 300 and the power module 400 may be implemented into one chip while the biometric authentication sensor 100 and the MCU 200 may be implemented as individual chips. As yet another example, the security module 300, the power module 400, and the MCU 200 may be implemented into one chip while the biometric authentication sensor 100 may be implemented as an individual chip.

Meanwhile, according to some example embodiments, the biometric authentication sensor 100, the MCU 200, the security module 300, and the power module 400 may be implemented into one chip as shown in FIG. 3. The chip may include processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The biometric authentication sensor 100 may be a sensor sensing biometric information of the user. The biometric information includes, for example, fingerprint, footprint, iris, face, and/or blood vessel information. Although the following description is directed to the fingerprint information as an example, the present disclosure is not limited thereto, and anything related to the user's biometric information can be included.

According to some example embodiments, the biometric authentication sensor 100 may be a fingerprint sensor. The fingerprint sensor may be, for example, at least one of an optical fingerprint sensor, a piezoelectric fingerprint sensor, an electrostatic fingerprint sensor, an ultrasonic fingerprint sensor, or a thermal fingerprint sensor. However, example embodiments are not limited thereto.

The biometric authentication sensor 100 may sense the biometric information of the user, acquire the biometric information as a raw image, and send the raw image to the MCU 200.

The MCU 200 may receive the raw image from the biometric authentication sensor 100, extract biometric features from the raw image, and output a matching template including the extracted biometric features.

According to some example embodiments, in the case of using the fingerprint information as biometric information, the MCU 200 may extract the biometric features based on fingerprint geographical characteristics such as bifurcation, ridge end, and valley or ridge line shapes using a desired (or, alternatively, a predetermined) feature point extraction algorithm and output a matching template. The feature point extraction algorithm may be at least one of various extraction algorithms.

According to some example embodiments, the MCU 200 may further perform anti-spoofing for discriminating fake biometric information by generating a transformation such as applying filtering to the raw image.

According to some example embodiments, the MCU 200 may control overall operations of the biometric authentication sensor 100.

The security module 300 may process and store security information requiring security. According to some example embodiments, the security module 300 may store first security information for information relevant to an application or second security information relevant to a financial settlement service or embedded identification (ID) service.

According to an example embodiment, the first security information may include information for a service relevant to an application. For example, the first security information may include information requiring security such as user authentication information. The user authentication information is biometric information, which may include, for example, user identification information such as iris, fingerprint, blood vessels, and face information.

According to an example embodiment, the second security information may include information relevant to a financial service (e.g., payment service).

According to some example embodiments, the security module 300 may be a hardware component. The security module 300 may be implemented as a single chip supporting two or more protocols in an integral manner. For example, the security module 300 may support communication protocols and non-communication protocols.

According to some example embodiments, the security module 300 compares the matching template received from the MCU 200 with a previously stored verification template, selects a user index as a result of the comparison, and outputs payment class information and payment means information to the payment terminal 2000 according to the selected user index.

In detail, referring to FIG. 4, the security module 300 may include an MCU interface 10, a matching unit 20, a template storage unit 30, a user table memory 40, a payment module 50, and a payment terminal device interface 60.

As discussed below, in some example embodiments, the MCU I/F 10 and the POS I/F may be interfaces that communicate with the MCU 200 and the payment terminal 2000, respectively, the template storage 30 and the user table memory 40 may be one or more non-volatile memories, and the matching unit 20 and payment module 50 may be implemented by processing circuitry including logic circuits or a processor executing software to perform the functions thereof, where such processing circuitry may be discrete processing circuitry or, alternatively, may be implemented by the micro control unit (MCU) 200 itself such that the processing circuitry associated with the micro control unit 200 may perform the functions of the security module 300 and the sub-components thereof, such as the matching unit 20 and the payment module 50.

The MCU interface 10 may be connected to the MCU 200 to receive biometric features of the raw image, i.e., matching data, from the MCU 200. For example, the MCU interface 10 may include an international organization for standardization (ISO) interface. For example, the MCU interface 10 may be a normal memory interface. The normal memory interface may include at least one of a serial peripheral interface (SPI), a peripheral component interface express (PCIe), or a double data rate (DDR). However, example embodiments are not limited thereto.

According to some example embodiments, the matching unit 20 compares the received matching template with the verification template and outputs a comparison result. The comparison result indicates whether there is a verification template identical with the matching template among a plurality of verification templates and it is outputted to the user table memory 40.

According to some example embodiments, the template storage unit 30 may store at least one user index and at least one template corresponding to each user index.

In detail, referring to FIG. 5, the template storage unit 30 may store user indexes (User 1, User 2, and User 3) respectively corresponding to at least one user included in the second security information according to an example embodiment.

According to an example embodiment, the template storage unit 30 may store a plurality of templates (Templates A11, A12, A21, A31, A32, and A33), which may be, for example, the first security information. According to some example embodiments, the first security information may include a plurality of templates based on the biometric authentication information of each of a plurality of users.

According to some example embodiments, each user may be matched with at least one verification template. According to an example embodiment, User 1 may store Template A11 for the thumb of the right hand and Template A12 for the index finger of the right hand as the corresponding verification templates. According to another example embodiment, User 2 may store Template 21 for one finger as the corresponding verification template. According to still another example embodiment, User 3 may store Template A31, Template A32, and Template A33 for three fingerprints as the respective corresponding verification templates.

Meanwhile, according to some example embodiments, User 3 may store Template A31 for at least one fingerprint and Template A32 and Template A33 for other biometric authentication information (e.g., blood vessel information) as the respective verification templates.

Referring to FIGS. 4 and 6, according to some example embodiments, the user table memory 40 includes the user indexes, the payment class information, and the payment means information.

In detail, referring to FIG. 6, the user table memory 40 may include information on application usage control (AUC) 411 and 421, floor limits 412 and 422, and payment online/offline 413 and 423 connected to the user indexes 41 and 42.

For example, the user index 41 stores the information on the AUC 411, the floor limit 412, and the payment online/offline 413 linked by the corresponding user index.

According to some example embodiments, the AUC 411 may include member store information or available area (domestic and abroad) corresponding to the payment means information, available terminals (ATM, restaurant terminal, etc.), and available services (cash transfer, credit transfer, product purchase, service purchase, etc.).

According to some example embodiments, if the payment online/offline information is set to an online mode, the payment terminal 2000 transmits a payment approval request to the payment server 3000 and determines whether the payment is approved according to a response from the payment server 3000.

According to some example embodiments, if the payment online/offline information is set to an offline mode, the payment terminal 2000 does not transmit the payment approval request to the payment server 3000, and determines whether a member store at which the payment terminal is installed is included in the AUC 411 and 412 to autonomously determine whether to approve the payment. For example, the payment terminal 2000 may include the sale-related information such as a business field and address of the member store and products for sale in the store and compare the received AUC with the sale-related information.

According to some example embodiments, the floor limit 412 may include the payment class information. The payment class information may be information on a credit limit, a usage place range, and a usage time range.

According to some example embodiments, the payment online/offline information may include information indicating whether the payment can be approved only offline without intervention of the payment server 3000 or online via the intervention of the payment server 3000.

The payment module 50 may include the payment means information. According to some example embodiments, in relation to the card, the payment means information may include card data such as a card number, an expiry date, a name, and an authentication key, as an example of card identification information. The card data may be stored, for example, when the card is issued by the financial institution. According to some example embodiments, in relation to the account, the payment means information may include account data such as a financial institution name, an account type, an account number, a name, and an authentication key, as an example of account identification information.

According to some example embodiments, the template storage unit 30 and the user table memory 40 may be non-volatile memories. Examples of the non-volatile memory may include a read only memory (ROM), a programmable ROM (PROM), an erasable programmable ROM (EPROM), an electrically erasable programmable ROM (EEPROM), and a flash memory.

Further, the payment module 50 receives a user index corresponding to the matching template from the matching unit 20 and payment information corresponding to the user index from the user table memory 40. The payment information may include the received AUC, floor limit, and payment online/offline information, may be transmitted to the payment terminal 2000 through the payment terminal interface 60, and may be encrypted and outputted according to some example embodiments.

According to some example embodiments, the user may be, for example, a caretaker that may set the floor limit 412 in order for an under-aged minor to use the same payment means. In this case, the payment means may be identical. However, the floor limits 412 and 422 may be set to User 1 41 for use by the caretaker him/herself and User 2 42 for use by the under-aged minor as a child along with different settings such as daily or one-time maximum usage cost, usage limit based on the business field of retail business possessing the payment terminal 2000, and late dawn time usage limit.

According to some example embodiments, it may be possible for the same user to use the same smart card as if it is a different payment means. For example, User 1 41 may be set for personal use, and User 2 42 may be set for business use. According to an example embodiment, the payment means information may include payment card or payment account information for personal use. The payment means information may include payment card or payment account information for business use. In this case, there may be two payment means for the same financial institution. The floor limits 412 and 422 may also be set to different credit limits, usage place limits, usage time limits, and usage area limits according to the user index.

Meanwhile, a signal outputted from the security module 300 may be encrypted with a security key included in the security module for security and then outputted to the outside through the MCU interface 10 or the payment terminal interface 60.

Referring back to FIGS. 2 and 3, the smart card 1000 may further include the power module 400. According to some example embodiments, the power module 400 may further include a communication circuit. The communication circuit may transmit a signal received from at least one of the biometric authentication sensor 100, the MCU 200, or the security module 300 to an external device, or may transmit a signal received from the external device to at least one of the biometric authentication sensor 100, the MCU 200, or the security module 300. According to an example embodiment, the communication circuit may include a communication-related component such as a radio frequency (RF) front end capable of performing RF harvesting, as illustrated in FIG. 2.

Figure 7:
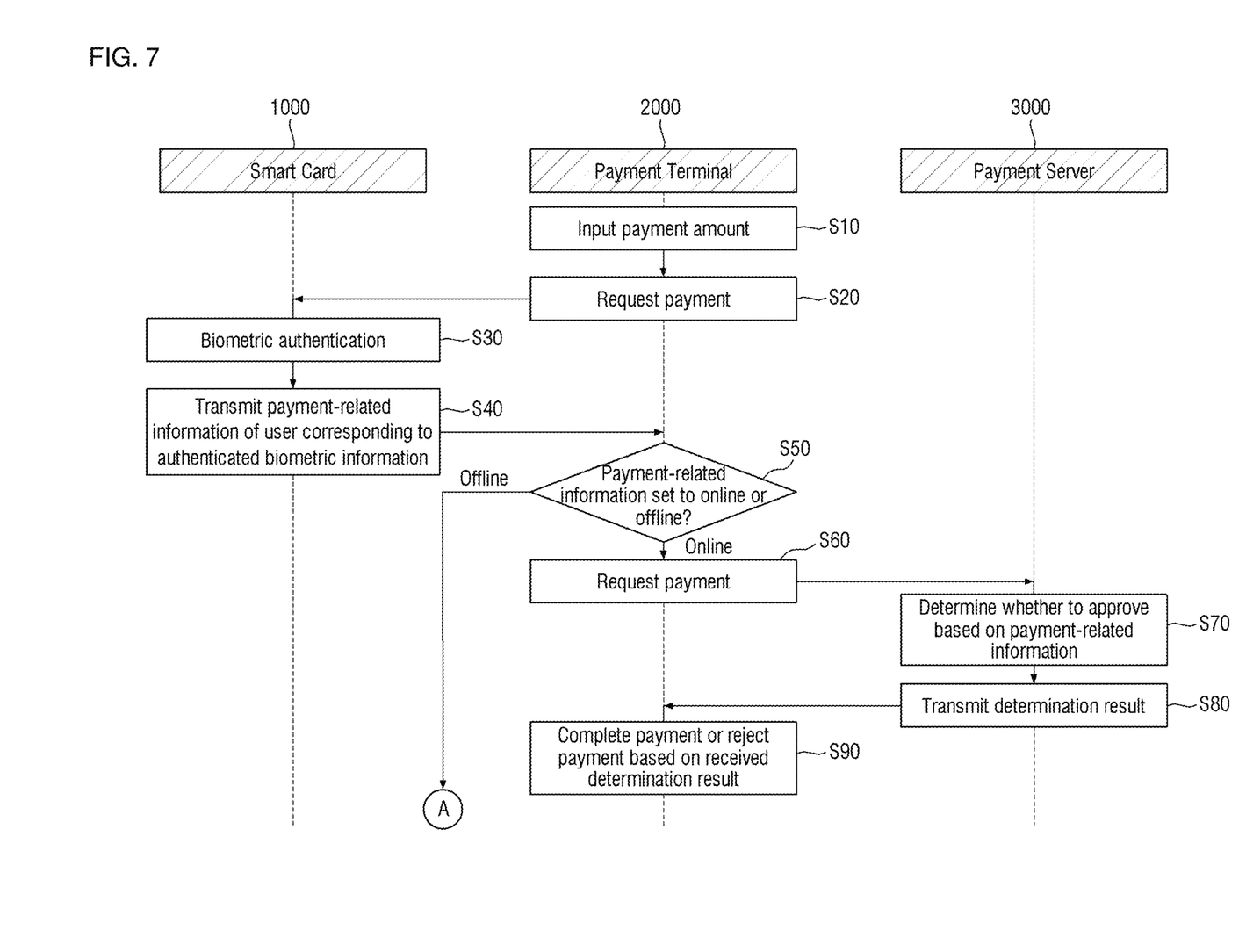
FIGS. 7 to 9 are flowcharts illustrating an operation method of a biometric authentication smart card payment system according to some example embodiments.
Figure 8:
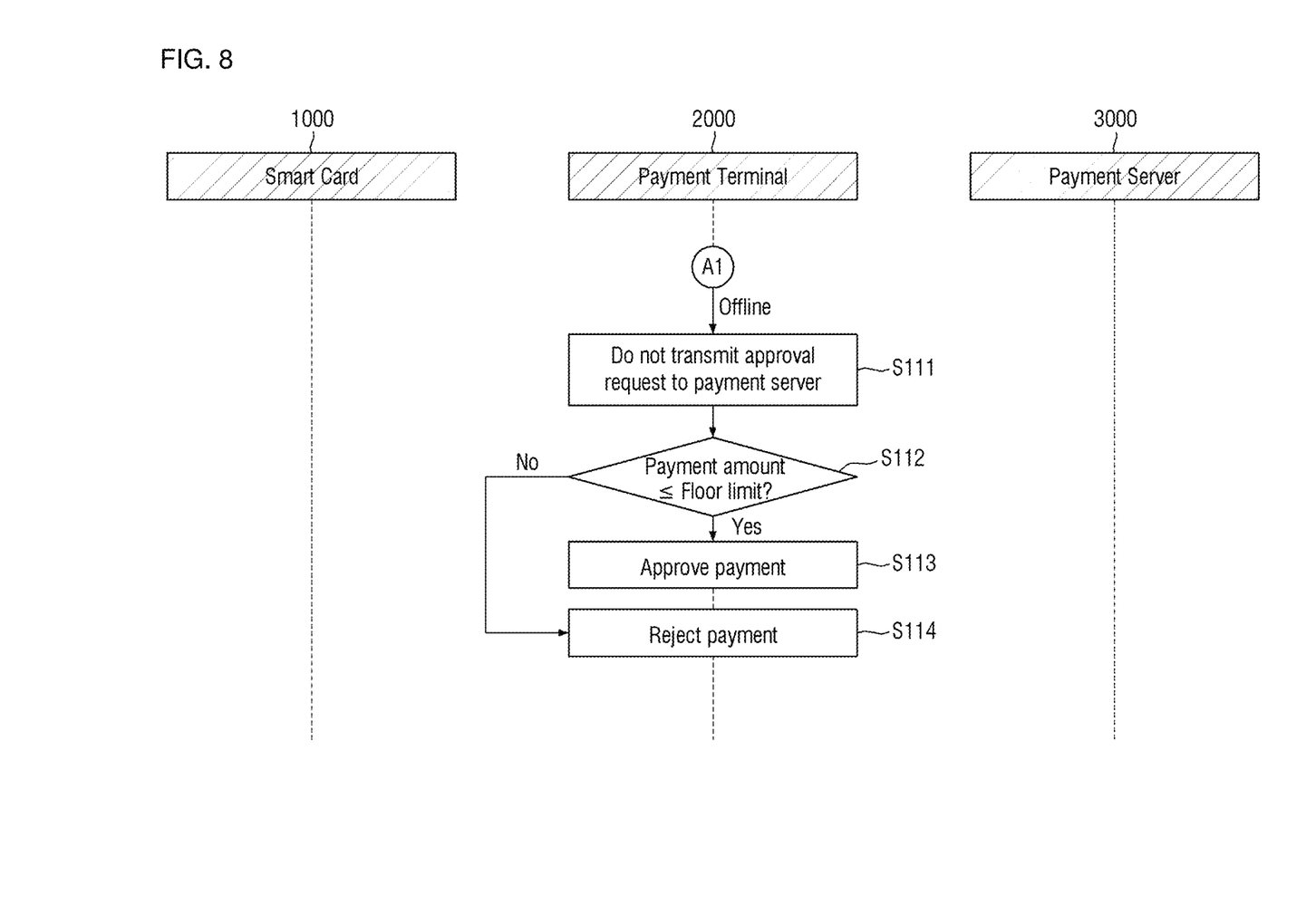
Figure 9:
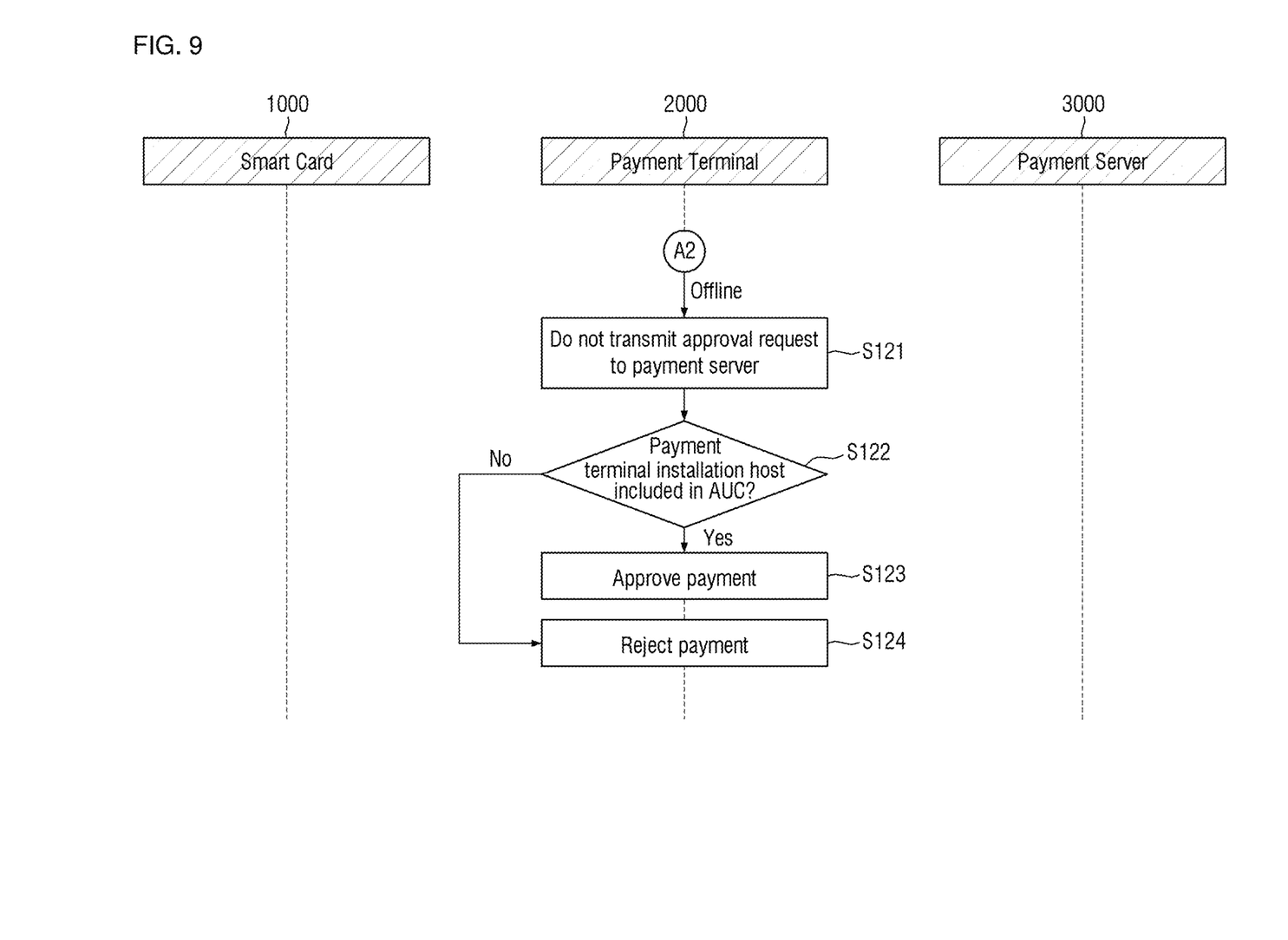

FIGS. 7 to 9 are flowcharts illustrating an operation method of a biometric authentication smart card payment system according to some example embodiments.

Referring to FIG. 7, in the biometric authentication smart card payment system according to some example embodiments, the payment terminal 2000 may store sale-related information such as product codes, payment amounts, and inventory information on products for sale. For example, a seller may pre-store (or, alternatively, store) the sale-related information in the payment terminal 2000.

In operation S10, the payment terminal 2000 may receive an input of a payment amount according to the product code, and, in operation S20, the payment terminal 2000 transmits a payment request to the smart card 1000 in response to the input payment amount.

In operation S30, upon receipt of the payment request, the smart card 1000 authenticates biometric information of the user. For example, according to some example embodiments, the smart card 1000 senses the biometric information by means of the biometric authentication sensor 100 under the control of the MCU 200 to generate a raw image, and processes the raw image by means of the security module 300.

In operation S40, if the user is identified as a normal user (i.e., matching is successful), the smart card 1000 transmits the payment-related information to the payment terminal 2000 according to the user index corresponding to the input biometric information. According to some example embodiments, the payment-related information may include payment class information and payment means information based on the user index.

According to some example embodiments, in operation S40, if there is no verification template matching the sensed biometric information among the plurality of stored verification templates, i.e., the user is identified as an abnormal user, the smart card 1000 may transmit a biometric authentication failure notification to the payment terminal 2000.

Operations S30 and S40 performed by the smart card 1000 will be discussed in more detail below with regards to FIGS. 10 and 11.

In operation S50, upon receipt of the payment-related information from the smart card 1000, the payment terminal 2000 determines whether to make a payment approval online or offline based on the payment class information.

If the payment online/offline information included in the received payment-related information is set to online, in operation S60, the payment terminal 2000 transmits a payment request to the payment server 3000. The payment request transmitted from the payment terminal 2000 to the payment server 3000 may include, for example, the sale-related information and the payment-related information.

In operation S70, the payment server 3000 determines whether to approve the product for sale and payment amount included in the sale-related information based on the user's AUC, and floor limit included in the payment-related information. For example, the payment server 3000 may determine whether the received AUC is indicative of an authorized user by determining whether the product for sale and payment amount are within tolerated ranges based on the floor limit.

In operation S80, the payment server 3000 transmits a determination result to the payment terminal 2000.

In operation S90, the payment terminal 2000 completes the payment for the case where the determination result indicates approval and rejects the payment for the case where the determination result indicates disapproval.

Meanwhile, according to some example embodiments, if the payment terminal 2000 determines that the payment online/offline information included in the received payment-related information is set to offline, indicated "A", the payment terminal 2000 may determine whether to approve the payment offline based on whether the payment amount is less than or equal to a floor limit (A1 of FIG. 8) or based on whether the payment terminal installation host is include in the AUC (A2 of FIG. 9)

For example, referring to FIG. 8, in operation S111, the payment terminal 2000 does not transmit the payment request to the payment server 3000, and instead, in operation S112, compares the payment amount included in the received sale-related information with the floor limit included in the payment-related information.

In operation S113, the payment terminal 2000 may approve payment for the case where the payment amount is equal to or less than the credit limit amount of the floor limit. In contrast, in operation S114, the payment terminal 2000 may reject the payment for the case where the payment amount is greater than the credit limit amount.

As another example, referring to FIG. 9, in operation S121, the payment terminal 2000 does not transmit the payment request to the payment server 3000 and, instead, in operation S122, compares the installation host indicated in the received sale-related information with the AUC included in the payment-related information.

In operation S123, the payment terminal 2000 may approves the payment for the case where the installation host is included in the AUC of the configured business field.

In contrast, in operation S124, the payment terminal 2000 may reject the payment for the case where the installation host is not included in the AUC.

Figure 10:
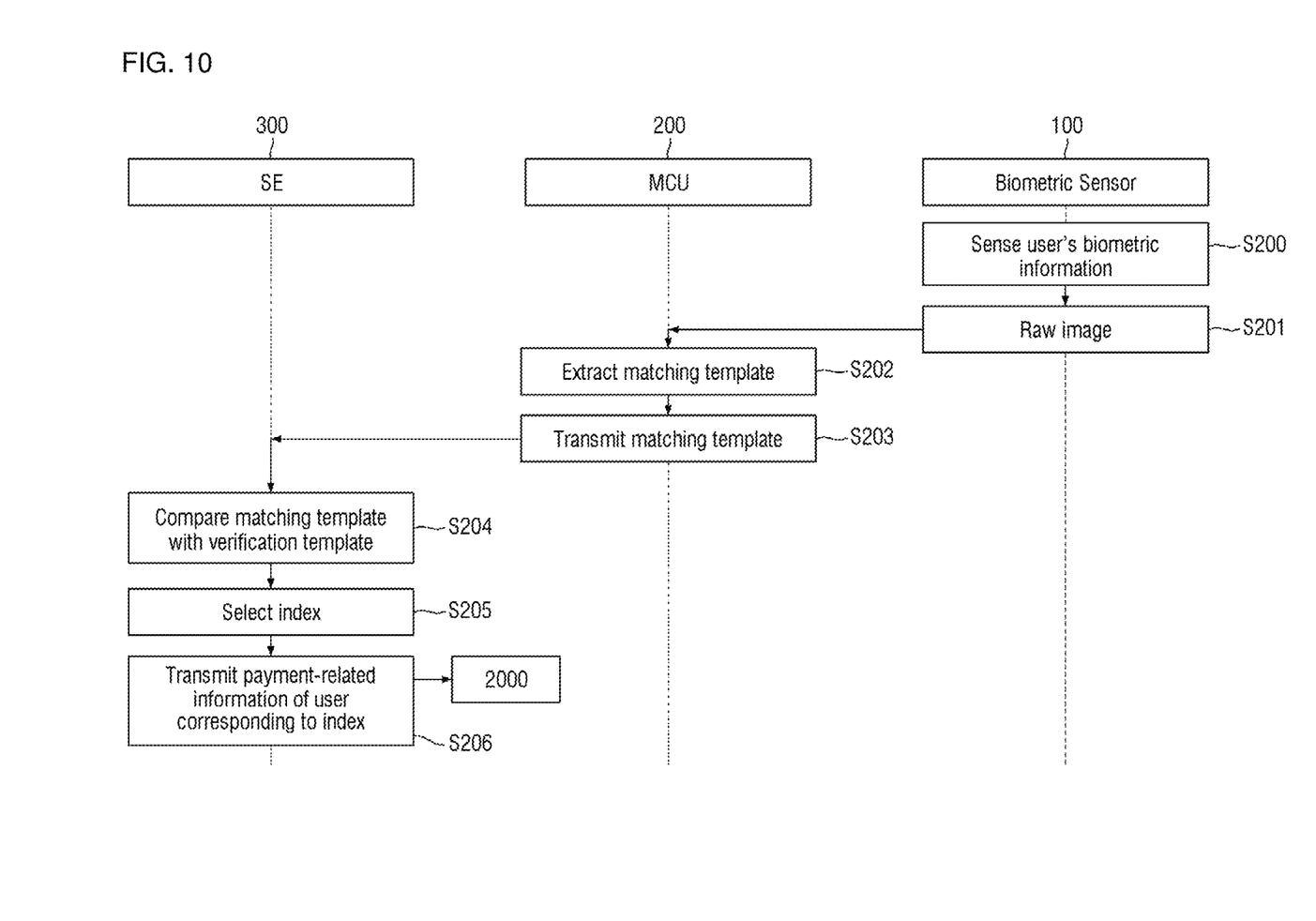
FIGS. 10 and 11 are flowcharts illustrating an operation method of a biometric authentication smart card according to some example embodiments.
Figure 11:
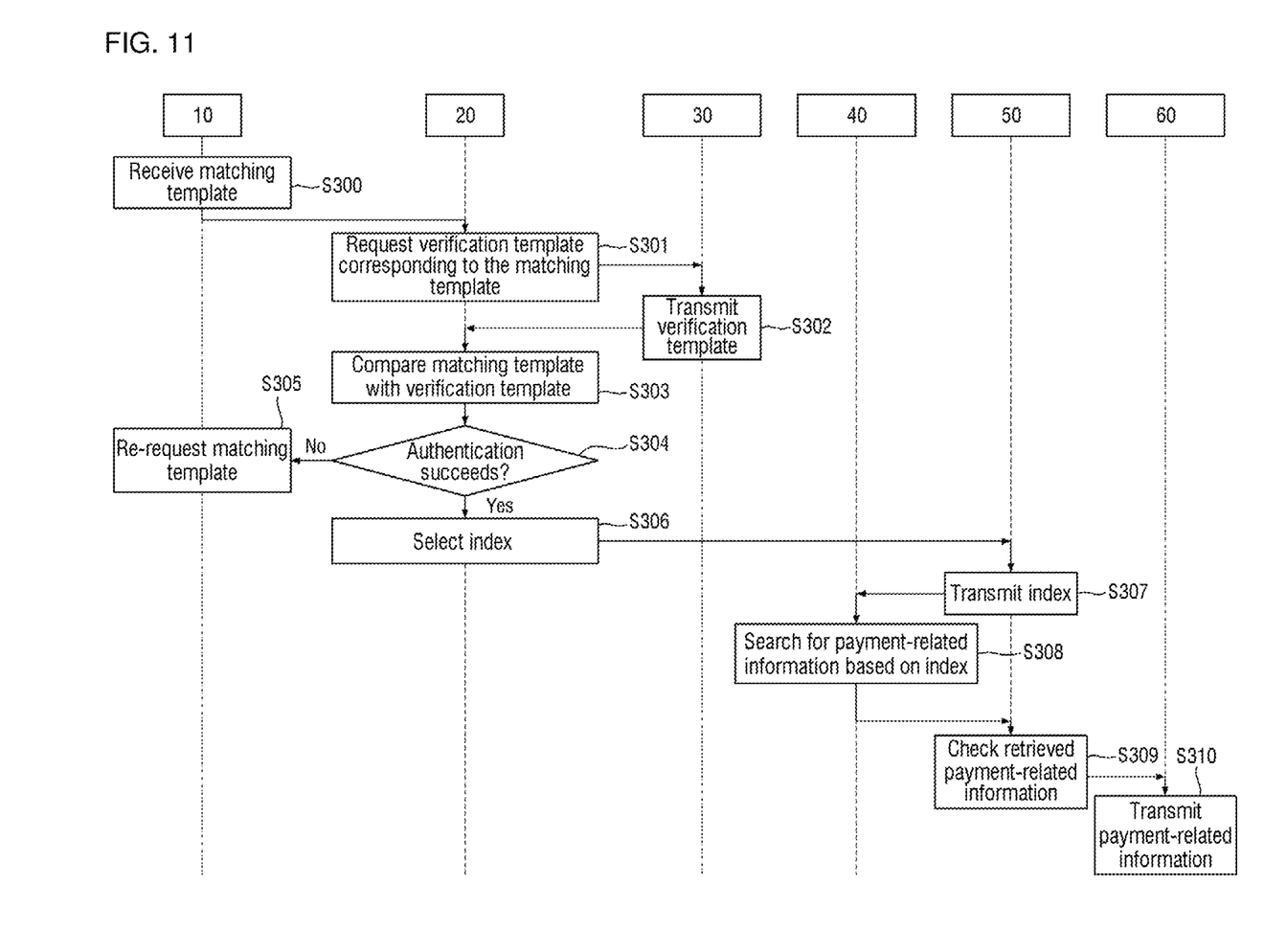

FIGS. 10 and 11 are flowcharts illustrating an operation method of a biometric authentication smart card according to some example embodiments.

Referring to FIG. 10, in response to the smart card 1000 receiving the payment request from the payment terminal 2000 in operation S20, the smart card 1000 may perform the following operations to authenticate the user and determine payment related information of the user.

According to some example embodiments, in operation S200, the biometric authentication sensor 100 senses biometric information inputted from the user, and in operation S201, the biometric authentication sensor 100 sends the sensed raw image to the MCU 200.

In operation S202, the MCU 200 performs anti-spoofing and image processing for extracting feature points to extract a matching template, and, in operation S203, the MCU 200 sends the extracted matching template to the security module 300.

In operation S204, the security module 300 compares the matching template with the stored verification templates. In operation S205, the security module 300 selects a user index based on the comparison result, and, in operation S206, the security module 300 transmits the payment-related information corresponding to the selected index to the payment terminal 2000.

Operations S204 to S206 performed by the security module 300 will be discussed below with reference to FIG. 11.

Referring to FIG. 11, in operation S300, the MCU interface 10 transmits the matching template to the matching unit 20.

In operation S301, the matching unit 20 accesses the template storage unit 30 to request at least one verification template.

In operation S302, the template storage unit 30 sends at least one of the plurality of verification data to the matching unit 20.

In operation S303, the matching unit 20 compares the matching template with the verification template.

If there is no verification template matched (i.e., authentication fails), according to an example embodiment, in operation S305, the matching unit 20 re-requests the matching data, or may end the authentication operation. The re-request for matching data may be made via the payment terminal 2000 according to an example embodiment or by blinking an LED implemented in the smart card according to another example embodiment.

In contrast, if there is any verification template matched (i.e., authentication succeeds), in operation S306, the matching unit 20 sends a user index corresponding to the verification template to the payment module 50.

In operations S307 and S308, The payment module 50 searches the user table memory 40 for payment-related information based on the received user index. That is, it requests the payment-related information corresponding to the user index. In operation S309, the user table memory 40 sends the retrieved payment-related information to the payment module 50.

In operation S310, the payment module 50 checks and outputs the payment-related information through the payment terminal interface 60. Here, the payment-related information may be data encrypted with a preconfigured security key according to some example embodiments.

While the operations illustrated in FIG. 11 and performed by the security module 300 have been discussed with regards to elements 10 to 60 illustrated in FIG. 4, example embodiments are not limited thereto. For example, in some example embodiments, the MCU I/F 10 and the POS I/F may be interfaces that communicate with the MCU 200 and the payment terminal 2000, respectively, the template storage 30 and the user table memory 40 may be non-volatile memory, and the matching unit 20 and payment module 50 may be implemented by processing circuitry including logic circuits or a processor executing software to perform the functions thereof, where such processing circuitry may be discrete processing circuitry or, alternatively, may be implemented by the micro control unit (MCU) 200 itself such that the processing circuitry associated with the micro control unit 200 may perform the functions of the security module 300 and the sub-components thereof, such as the matching unit 20 and the payment module 50.

In concluding the detailed description, those skilled in the art will appreciate that many variations and modifications can be made to the disclosed example embodiments without substantially departing from the principles of the present disclosure. Therefore, the disclosed example embodiments of are used in a generic and descriptive sense only and not for purposes of limitation.

What is claimed is:

1. A biometric authentication smart card comprising:
    a biometric authentication sensor configured to sense at least two types of biometric information of a user and to generate raw images therefrom; and
    processing circuitry configured to,
        generate a matching template including biometric features based on the raw images,
        select a user index from among a plurality of user indices based on the matching template, and
        output, to a payment terminal, payment class information and payment means information set adaptively for the user index.

2. The biometric authentication smart card of claim 1, wherein the payment class information is customizable for each of the plurality of user indices and includes an indication of at least one of a credit limit amount, a usage place range, a usage time range, available terminals, and available services.

3. The biometric authentication smart card of claim 1, wherein the processing circuitry is configured to,
    process and store first security information for the matching template, and second security information for the payment class information and the payment means information, and
    encrypt and output the first security information or the second security information.

4. The biometric authentication smart card of claim 1, further comprising:
    at least one memory configured to store verification templates, and to store payment information corresponding to the plurality of user indices, wherein
        the processing circuitry is configured to compare the matching template with at least one of the verification templates to generate a comparison result, and to select the user index from among the plurality of user indices based on the comparison result.

5. The biometric authentication smart card of claim 4, wherein the payment information includes application usage control (AUC), the payment class information and payment online/offline information corresponding to the plurality of user indices.

6. The biometric authentication smart card of claim 5, wherein the payment information further includes a floor limit and the payment means information.

7. The biometric authentication smart card of claim 4, wherein the processing circuitry is configured to output the payment information and the payment means information to the payment terminal.

8. The biometric authentication smart card of claim 7, wherein the processing circuitry is configured to output the payment information to the payment terminal such that the payment terminal determines whether to approve a payment amount of sale-related information based on the payment information.

9. The biometric authentication smart card of claim 7, wherein the processing circuitry is configured to output the payment information to the payment terminal such that the payment terminal the payment terminal determines whether to transmit a payment approval request for a payment amount to a payment server based on payment online/offline information included in the payment information.

10. The biometric authentication smart card of claim 4, wherein the processing circuitry is configured to output, to the payment terminal, payment information based on the user index such that the payment information output to the payment terminal based on a first user index is different from the payment information output to the payment terminal based on a second user index.

11. The biometric authentication smart card of claim 1, wherein the biometric authentication sensor and the processing circuitry are implemented into at least one chip.

12. A smart payment system comprising:
    a payment terminal configured to request a payment amount based on sale-related information, and to approve a payment by comparing the sale-related information and the payment amount with payment class information; and
    a biometric authentication smart card including,
        a biometric authentication sensor configured to sense at least two types of biometric information of a user and to generate raw images therefrom, and
        processing circuitry configured to,
            generate a matching template including biometric features based on the raw images,
            select a user index from among a plurality of user indices based on the matching template, and
            output, to the payment terminal, the payment class information and payment means information set adaptively for the user index, wherein the payment means information corresponds to the request.

13. The smart payment system of claim 12, wherein the payment class information is customizable for each of the plurality of user indices and includes an indication of a credit limit amount, a usage place range, and a usage time range.

14. The smart payment system of claim 13, wherein the payment terminal is configured to approve the payment based on the payment means information, in response to the sale-related information being within the usage place range and the usage time range, and the payment amount being less than or equal to the credit limit amount.

15. The smart payment system of claim 12, wherein the biometric authentication smart card further comprises:
at least one memory configured to store verification templates for each of a plurality of users, wherein
the processing circuitry is configured to compare the matching template with at least one of the verification templates to generate a comparison result, and to select the user index from among the plurality of user indices based on the comparison result.

16. The smart payment system of claim 15, wherein
the at least one memory is configured to store payment information corresponding to the plurality of user indices, the payment information including application usage control (AUC) and the payment class information, and
the processing circuitry is configured to encrypt the payment information based on the user index to generate encrypted payment information, and to output the encrypted payment information to the payment terminal.

17. The smart payment system of claim 16, wherein the payment class information includes payment online/offline information indicating whether the payment terminal is connected to a payment server.

18. The smart payment system of claim 17, wherein the payment terminal is configured to transmit a payment approval request to the payment server, when the payment online/offline information is set to an online mode.

19. The smart payment system of claim 17, wherein the payment terminal is configured to autonomously determine whether to approve the payment according to whether the payment terminal is included in the AUC, if the payment online/offline information is set to an offline mode.

20. A method implemented by a biometric authentication smart card, the biometric authentication smart card including a biometric authentication sensor and processing circuitry, the method comprising:
sensing, by the biometric authentication smart card via the biometric authentication sensor, at least two types of biometric information of a user;
generating, by the biometric authentication smart card via the biometric authentication sensor, raw images based on the at least two types of biometric information of the user;
generating, by the biometric authentication smart card via the processing circuitry, a matching template including biometric features based on the raw images;
selecting, by the biometric authentication smart card via the processing circuitry, a user index from among a plurality of user indices based on the matching template; and
outputting, by the biometric authentication smart card via the processing circuitry, payment class information and payment means information to a payment terminal such that the payment class information and payment means information is set adaptively for the user index.

* * * * *